US008584540B2

(12) United States Patent
Dahlén et al.

(10) Patent No.: US 8,584,540 B2

(45) Date of Patent: Nov. 19, 2013

(54) METHOD FOR MEASURING CONDITIONS IN A POWER BOILER FURNACE USING A SOOTBLOWER

(75) Inventors: Erik Dahlén, Göteborg (SE); Mikael Niklasson, Mölnlycke (SE)

(73) Assignee: Soottech Aktiebolag, Gothenburg (SE)

( * ) Notice: Subject to any disclaimer, the term of this patent is extended or adjusted under 35 U.S.C. 154(b) by 347 days.

(21) Appl. No.: 12/991,133

(22) PCT Filed: May 13, 2009

(86) PCT No.: PCT/SE2009/050537

§ 371 (c)(1), (2), (4) Date: Nov. 10, 2010

(87) PCT Pub. No.: WO2009/139714

PCT Pub. Date: Nov. 19, 2009

(65) Prior Publication Data

US 2011/0056313 A1 Mar. 10, 2011

(30) Foreign Application Priority Data

May 13, 2008 (SE) ....................................... 0801081

(51) Int. Cl.

*G01D 21/00* (2006.01)

*F22B 37/18* (2006.01)

(52) U.S. Cl.

USPC .......................................... 73/866.5; 122/379

(58) Field of Classification Search

None

See application file for complete search history.

(56) References Cited

U.S. PATENT DOCUMENTS

| | | | | |
|---|---|---|---|---|
| 4,085,438 | A | 4/1978 | Butler | |
| 4,495,804 | A * | 1/1985 | Le Blanc et al. | 340/854.6 |
| 5,416,946 | A | 5/1995 | Brown | |
| 5,615,953 | A * | 4/1997 | Moskal | 374/7 |
| 6,966,235 | B1 * | 11/2005 | Paton | 73/865.9 |
| 2006/0005786 | A1 * | 1/2006 | Habib et al. | 122/379 |

FOREIGN PATENT DOCUMENTS

| | | |
|---|---|---|
| EP | 0947625 A1 | 3/1999 |
| JP | 63163124 | 7/1988 |
| JP | 07-234185 | 9/1995 |
| SU | 1802258 | 11/1990 |
| WO | 2004005834 A1 | 1/2004 |

OTHER PUBLICATIONS

International Search Report & Written Opinion (mailed Jul. 10, 2009) in parent PCT Application.

Chinese Office Action issued Sep. 25, 2012 in corresponding Application No. 200980116657.1.

Russian Federation Office Action issued May 3, 2013 in corresponding Russian Federation Application No. 2010143982.

* cited by examiner

*Primary Examiner* — Hezron E Williams

*Assistant Examiner* — Nathaniel Kolb

(74) *Attorney, Agent, or Firm* — Jeffrey S. Melcher; Manelli Selter PLLC

(57) ABSTRACT

The present invention relates to a method for measuring the conditions inside a power boiler wherein a sootblower is used as a measuring probe. The invention also relates to a system for measuring the conditions in a power boiler, comprising a control unit, at least one sensor and a measuring probe placed inside said furnace, wherein said probe is arranged on a soot blower.

25 Claims, 5 Drawing Sheets

METHOD FOR MEASURING CONDITIONS IN A POWER BOILER FURNACE USING A SOOTBLOWER

CROSS-REFERENCE TO RELATED APPLICATIONS

This application is a national stage entry under 35 U.S.C. 371 of International Application No. PCT/SE2009/050537, filed 13 May 2009, designating the United States. This application claims foreign priority under 35 U.S.C. 119 and 365 to Swedish Patent Application No. 0801081-1, filed 13 May 2008. The complete contents of these applications are incorporated herein by reference.

TECHNICAL FIELD

The present invention relates to a method for measuring the conditions inside a power boiler furnace.

BACKGROUND ART

In pulp industry, recovery furnaces are used as a chemical reactor and for the production of steam for internal use, for generation of electricity, and for sale. As the recovery furnace operates as a chemical reactor, the combustion conditions differ from those of an ordinary boiler, in that the heating surfaces of the furnace get covered extremely rapidly with combustion deposits, i.e. carryover/slag, dust and/or soot, which decrease the efficiency of the recovery furnace, particularly by reducing heat transfer in the furnace. In addition to soot, the flue gases contain inorganic chemicals, which condense on the heating surfaces of the recovery furnace.

In power boilers the thermal and chemically efficiency is normally depending on the mixture of fuel, combustible gases and the air in the furnace. In larger furnaces, there are local variations of the combustion depending on the location in the boiler. The combustion characteristics can for instance vary considerably between the wall and the middle of the furnace. An increased knowledge of the gas content and flue gas temperature in different furnace zones makes it possible to control the burning conditions to a greater extent in order to obtain an overall high combustion efficiency in the furnace, thus improving the use of heat surfaces and minimizing the emissions from the furnace.

Boiler furnaces require frequent cleaning of the heating surfaces by means of special cleaning apparatus, called sootblowers. Generally, the sootblowing system comprises about 10-80 sootblowers. The sootblowers clean the heating surfaces with high pressure steam, and generally about 2-10% of the steam production of the furnace is used for cleaning the furnace. If the time between successive cleanings in the furnace is too long, the dust-like particles get harder and/or sinter, and the deposits will be harder to remove. Thus, by minimizing the carryover in the furnace it is possible to also minimize the need for sootblowing and/or increase the efficiency of the production.

In order to control the chemical process and combustion process inside the furnace and to keep the sootblowing to a minimum, while at the same time cleaning sufficiently for the furnace to work efficiently, continuous and reliable measurements of the process are needed. However, to achieve the desired results is difficult due to the extreme temperatures and chemical conditions in the furnace and the fact that any sensors provided inside the furnace would themselves have to be cleaned from the soot or sintered dust from the process.

US2006005786 (Habib et al.) discloses a sootblower that is used inside a furnace. In order to control the operation of the sootblower, sensors are used to measure the properties of substances inside a combustion chamber connected to said sootblower. However, the technology does not disclose a method or device for measuring the conditions inside the furnace itself, and therefore does not present a reliable solution to the problem of monitoring or controlling the operation of said furnace.

The Japanese document JP63163124 shows the measuring of radiation energy inside a recovery furnace by providing a radiation thermometer on the wall surface of the furnace. Another method for measurement is shown in JP234185, where an optical fiber is inserted into a furnace to direct light from the process to a spectroscope for performing spectral analyses, and the European patent EP0947625A1 shows a method for measuring the conditions inside a recovery furnace by using a spectrometer for creating a continuous electromagnetic spectrum.

Another method is proposed by WO2004005834 (Schwade et al.), where a number of sensors and cameras are used to measure and monitor the conditions inside a furnace. The sensors are, however, placed inside the furnace itself, and so are themselves subject to the extreme conditions mentioned above. This severely limits the types of sensors that can be used, as well as the data that can be retrieved from them, and does not allow for detailed monitoring and control over the process inside the furnace.

These methods therefore all suffer from the lack of accuracy which arises when sensors are present in the highly chemical environment of the recovery furnace. Sensors mounted on motorized lances that are inserted into the furnace require cooling in order to preserve their ability to operate. They are also expensive due to the need of machinery that handles large probes of lengths around 4-8 m.

Inside the furnace a great amount of opaque flue gas obstructs the view, rendering it impossible to use ordinary measuring instruments to measure anything but the band of flue gas close to the wall of the furnace. Thus, no detailed information of the conditions towards the middle of the furnace can be achieved. Yet measurements must be made continuously during the process in order to control the operation of the furnace and initiate cleaning procedures when needed. The need for more accurate measurements is therefore apparent.

SUMMARY OF THE INVENTION

It is an object of the present invention to address the problems mentioned above. This, according to an aspect of the invention, is achieved by an arrangement as defined by claim 1, where a sootblower itself is used as a measuring probe. Thereby, the sensors can be placed outside the furnace, protected by the sootblower or even inside the sootblower itself and still perform the measurements on the conditions inside.

According to an aspect of the invention, the measurements take place when the sootblower is not used for cleaning the recovery furnace. Thereby, when the sootblower has been used inside the furnace and the steam is turned off, the sootblower is used as a probe and allows for testing inside the furnace or for measuring the state of the sootblower as it is retracted from the furnace.

According to another aspect of the invention, the measuring takes place at the same time as the lance tube of the sootblower is used for cleaning the recovery furnace. Thereby, maximum efficiency of the sootblower is achieved, since no separate operation of the lance of the sootblower is needed for the measuring process.

According to another aspect of the invention, the conditions measured can be the temperature, the carryover, the soot/dust build-up, the shape and structure of soot/dust, the soot/dust color, the visual image, the number of spots on heat surfaces or the lance tube, the surface rawness, the dust pH, and/or the dust thickness or hardness. All of these are factors which indicate the state of the process and the efficiency, and accurate measurements are especially beneficial when control over the process inside the furnace is desired.

According to another aspect of the invention, the conditions measured can be the sootblower lance temperature just outside the furnace wall. Thereby, the temperature increase on the lance can be used to calculate the flue gas temperature within the furnace. This is especially beneficial when control over the recovery boiler process is desired.

According to yet another aspect of the invention, the steam tubing inside the measuring probe can be used as an electric wave guide to facilitate communication between a sensor and a receiver, where at least one of said sensor and receiver is located at least temporarily inside the furnace. Thereby, information can be transmitted from a sensor placed in the front end of the measuring probe during measuring inside the furnace to a receiver placed outside the furnace.

According to a further aspect of the invention, a sensor placed in the measuring probe can store information for subsequent reading. Thereby, measurements taking place inside the furnace can be stored until the measuring probe and the sensor have been retracted from the highly chemical environment inside, and the data can be read or transmitted in a more manageable environment.

According to another aspect of the invention, a sensor mounted in connection to the lance tube can communicate with a receiver mounted outside the furnace. Thereby, contact can be established, for instance through radio waves, between sensor and receiver, in an easy and convenient manner.

According to yet another aspect of the invention, the sensor can be powered by a device located outside the furnace, for instance through radio waves. Thereby, the powering of the sensor can be solved in an easy and convenient manner.

According to yet another aspect of the invention, the sootblower is used to take a sample of the flue gas inside the furnace. Thereby, the sootblower can, when it is not being used to clean the furnace, take a sample at a desired location along its path of movement inside the furnace, and the gas can be transferred to a desired container for analysis or be measured continuously by a gas analyzer as the measuring probe enters or exits the furnace without blowing steam, thus yielding information of the composition of gas inside the furnace. This can also give information which is beneficial when desiring to control the process inside the recovery furnace.

According to yet another aspect of the invention, the sootblower is used for measurements that define the heat absorption at the heat surfaces. From this and other measurements of the boiler conditions, the soot thickness on the heat surfaces can be calculated, as well as the flue gas temperature and the creation of bands of flue gas inside the furnace, and thereby the need for sootblowing, among other things, can be estimated.

According to an aspect of the invention, the information obtained through the invention is used to automatically control the sootblowing system. Thereby, the sootblowing can be adapted to achieve the highest possible efficiency while at the same time saving steam and thereby saving energy.

According to a further aspect of the invention, the information given by the measurements is used to automatically control the fuel temperature, the fuel pressure, the burner settings, the combustion conditions or the chemical state inside the furnace. Thereby, these various conditions can be controlled separately and adjusted to each other in order to achieve the most beneficial conditions inside the furnace.

According to another aspect of the invention, the information obtained thanks to the invention is used to automatically control various properties of the process in the furnace, such as the distribution of air between the openings of the furnace, controlling the dampers, or burners, the combustion air flow, pressures and distribution, liquor gun angles, liquor/fuel temperature, fuel pressure. Thereby, the recovery process can be controlled and a higher efficiency be achieved thanks to the information yielded by the invention.

According to still another aspect of the invention the information obtained thanks to the invention is used for image processing in order to present the results of the measurements as an image. Thereby, rather complex information can be given in a way that is easy to interpret and use for controlling the process or for other purposes.

BRIEF DESCRIPTION OF THE DRAWINGS

The invention will now be described in more detail with reference to preferred embodiments and the appended drawings, wherein.

DETAILED DESCRIPTION OF THE INVENTION

Figure 1:
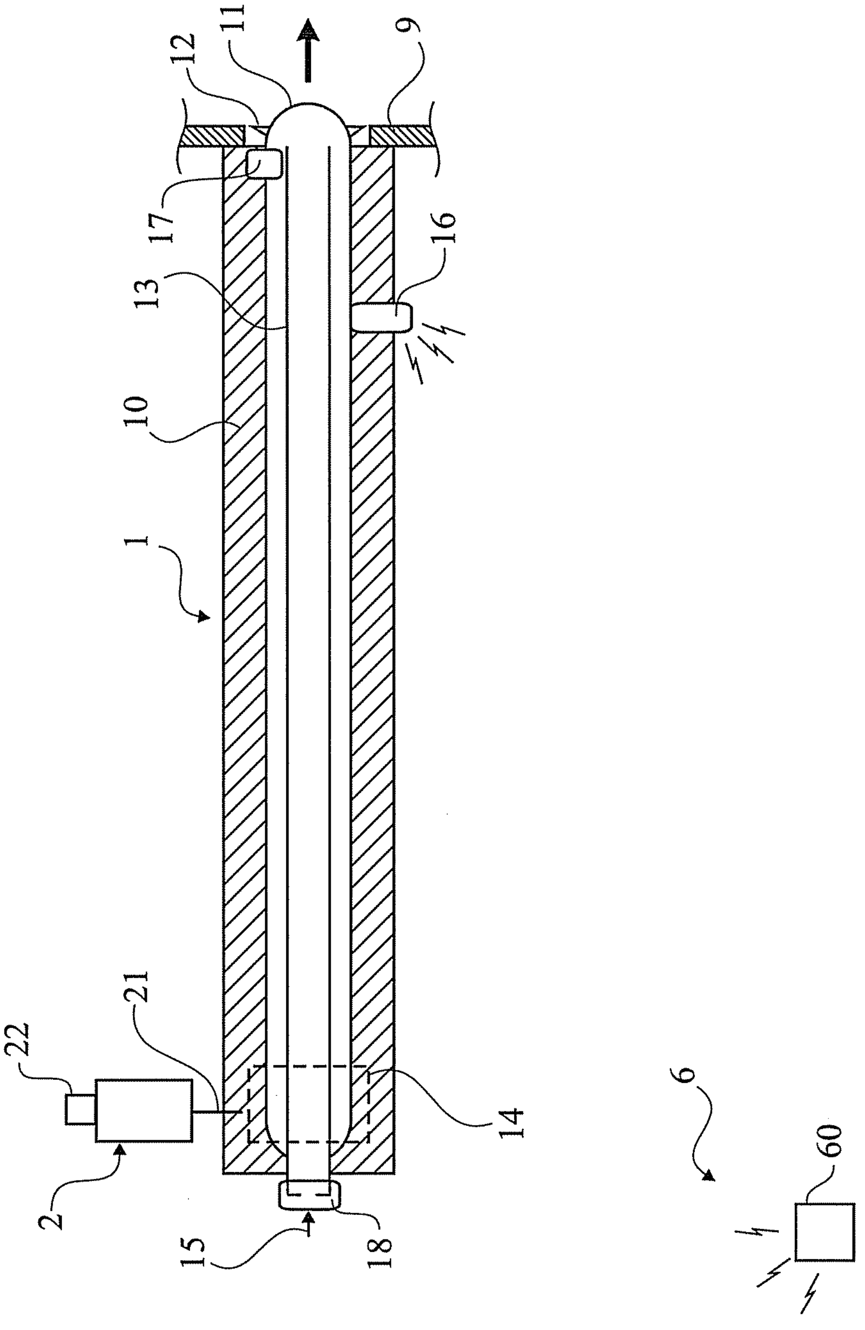
FIG. 1 is a schematic view of a sootblower in accordance with the present invention and having a lance tube in an end position and just starting its insertion into the recovery furnace.

FIG. 1 shows a schematic view of a sootblower arrangement 1, having a lance tube 11 retracted into an end position and just starting its insertion into the recovery furnace, the outer wall of which is designated 9. The sootblower arrangement 1 includes a frame 10, a moveable carriage 14 supported by the frame 10, and a motor 2 for moving the carriage (in a manner not shown) via a drive shaft 21. The lance tube 11 is mounted on the carriage 14 to be insertable into and retractable from the recovery furnace, and it has at least one but preferably two nozzles 12 for ejecting steam. The lance tube 11 surrounds an interior steam feed tube 13, to which an external steam feed tube (indicated by the arrow 15) is connected for feeding sootblowing steam to be ejected through said at least one lance tube nozzle 12 into the recovery furnace. A sensor 16 is mounted in the frame 10 for taking measurements on the segment of the surface of the lance shaft 11 closest to said sensor 16, and sensors can also be placed on the surface of or inside the lance tube 11. As the lance tube 11 of the sootblower 1 is inserted into or retracted from the furnace, these sensor can take a plurality of measurements on the surface of the lance tube 11 and the conditions inside the furnace, including temperature, carryover, soot/dust build-up, the shape and structure of soot, soot/dust color, and various properties of the dust in the furnace. It is also possible to use the lance tube 11 for taking samples of the flue gas for analysis.

In order to obtain accurate results for some of the measurements, such as the carryover, the temperature or the soot/dust build-up or for taking samples of the flue gas, the lance tube 11 of the sootblower 1 cannot, at the same time, be used for blowing steam, as the steam would act as a cooling agent along the lance tube 11 and prevent the taking of gas samples. Since a furnace is equipped with multiple sootblowers who operate simultaneously or serially inside, it would not normally be a problem to operate a sootblower without steam in order to perform the required measurements. If, however, the sootblowers, in order to lower the amount of steam needed and thereby the energy needed for powering the sootblowing system, were to use steam only partially, e.g. during the insertion phase, the retraction phase could be used for measurements and the desired data could be obtained without the need for separate operation of the sootblowers. This is the case in the preferred embodiment which is described below.

Figure 2:
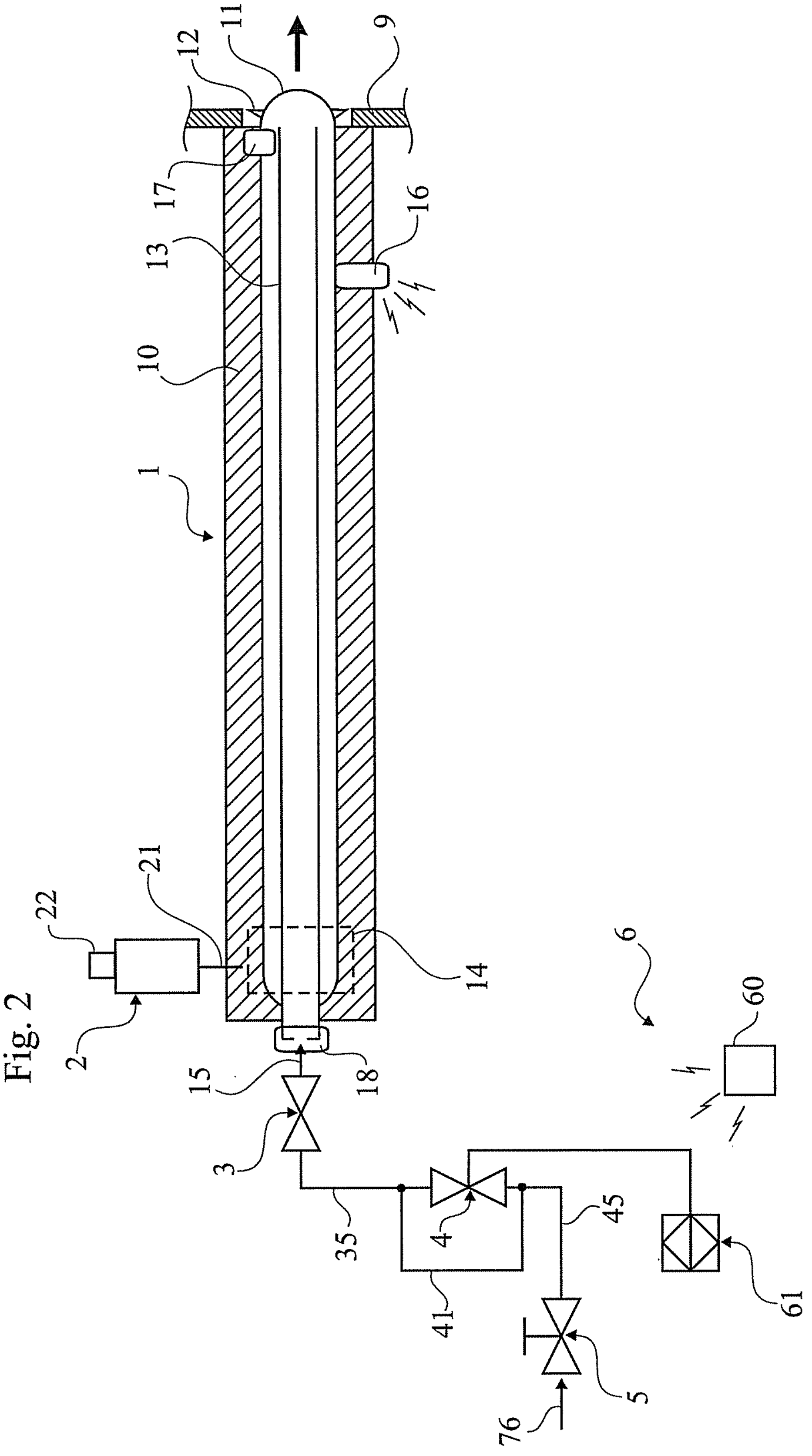
FIG. 2 is a schematic view of a preferred embodiment of a sootblower having a lance tube in an end position and just starting its insertion into the recovery furnace.

Thus, FIG. 2 shows a schematic view of a preferred embodiment of a sootblower arrangement 1 having a lance tube 11 retracted into an end position and just starting its insertion into the recovery furnace, the outer wall of which is designated 9. The sootblower arrangement 1 includes a frame 10, a moveable carriage 14 supported by the frame 10, and a motor 2 for moving the carriage (in a manner not shown) via a drive shaft 21. The lance tube 11 is mounted on the carriage 14 to be insertable into and retractable from the recovery furnace, and it has at least one but preferably two nozzles 12 for ejecting steam. The lance tube 11 surrounds an interior steam feed tube 13, to which an external steam feed tube 45, 35, 15 in this embodiment is connected for feeding sootblowing steam to be ejected through said at least one lance tube nozzle 12 into the recovery furnace. Along the external steam feed tube, there is a manually operated valve 5 that normally is put in its open position, but in some situations, e.g. in connection with maintenance, may be closed. At the outlet of the manually operated valve 5, there is a steam line 45 that leads to a directionally controlled valve 4. At the outlet of the directionally control valve 4 there is a steam line 35 leading to an on/off valve 3 having an outlet steam line 15 that is connected to the interior steam feed tube 13.

Accordingly the on/off valve 3 (e.g. a poppet valve, which valve however can also be of any other valve kind, e.g. a control valve) for admitting steam through said at least one nozzle 12 when the carriage 14 with the lance tube 11 is in its activated state, i.e. being moved into and out of the recovery furnace respectively, wherein the first valve 3 belongs to a sootblowing arrangement that was fitted in the recovery furnace prior to a rebuild according to the invention. The lance tube 11 generally rotates during insertion and retraction and may be rotationally driven by the motor 2 or by a separate drive. Further, the speed in one direction may be higher than in the other direction, e.g. the retraction speed may be higher than the insertion speed. A phase direction sensor 22 is arranged in connection with the motor 2, which sensor 22 senses the phase direction, i.e. the direction of rotation of the motor 2, and thereby may be used to detect the direction of movement of the lance tube 11. A control system unit 6, e.g. including a PLC 61 and/or a central server 60, is used to control the sootblowing based on detected sensor signals detected from applied sensors.

Figure 3:
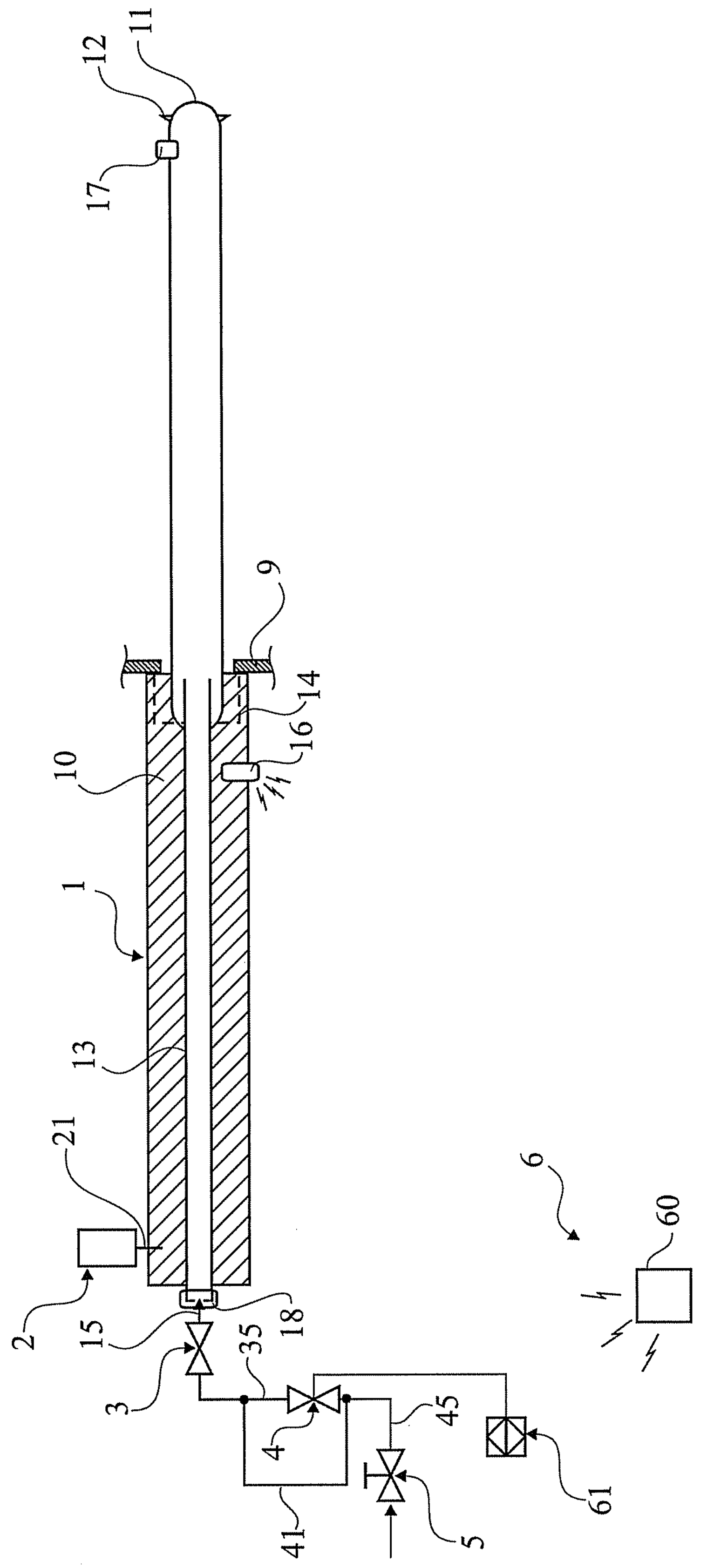
FIG. 3 is a schematic view of the sootblower of FIG. 2 having the inserted lance tube in its other end position.

In FIGS. 2 and 3 there is presented an embodiment where the second valve 4 is directionally controlled, such that it is open on insertion of the lance tube 11 but closed on retraction of the lance tube 11. Further, a throttled bypass conduit 41 is provided to permit a reduced flow of steam to pass the directionally controlled valve 4 to cool the lance tube 11 during the retraction thereof. (Alternatively the throttled bypass may be a conduit provided internally in the directionally controlled valve 4). The on/off valve 3 upstream of the directionally controlled valve 4 may be used for preventing leakage of steam through the bypass conduit 41 and accompanying steam losses when the lance tube 11 is fully retracted and inactive. Reference numeral 6 designates a PLC (Programmable Logic Controller) for opening and closing the directionally controlled valve 4. A sensor 16 is placed in the frame 10 outside the furnace for measuring along the lance tube 11.

An arrangement according to the invention, as presented schematically in FIGS. 2 and 3, functions in the following manner. A central control unit 60 initiates start of the motor 2 and opens the on/off valve 3 by means of providing signals to the switch mechanisms (not indicated) of each one of the motor 2 and the on/off valve 3 respectively. At the same time as the motor 2 starts to move the lance tube 11 into the recovery furnace a sensing unit 22 that senses the phase direction of the motor 2, will signalize to the PLC 6 that the lance tube is moving into the recovery furnace and as a consequence the PLC 6 will initiate opening of the directionally controlled valve 4. The manually operated valve 5 (as is normally the case) is set in its open position. Accordingly, steam will be supplied into the interior steam tube 13 thereby supplying steam with full pressure through the nozzle 12. During all of the travel of the lance tube 11 from its interior position shown in FIG. 2, to its fully extended position shown in FIG. 3, steam will be supplied to achieve efficient sootblowing of the heat exchanging surfaces of the recovery furnace. Now the central control unit 60 will receive some kind of sensor signal (that can be based on a large variety of sensing devices an/or measuring devices) that the lance tube 11 has reached its turning position, and as a consequence it will provide the control mechanism of the motor 2 to change the phase direction of the power supply, thereby initiating retraction of the lance tube 11. At the same time as the phase direction of the motor 2 is changed the phase direction sensing device 22 will signalize to the PLC (and/or central control unit 60) to initiate closure of the directionally controlled valve 4. Accordingly the valve 4 will shut off the steam supply to the lance tube 11, such that the retraction is performed without any sootblowing. In order to cool the lance tube during retraction a minor amount of steam is supplied also during retraction, by means of the bypass 41, bypassing the directionally controlled valve 4. When the lance tube 11 reenters into its innermost position, this will be signalized to the central control unit 60 and the on/off valve 3, thereby closing the on/off valve 3 and stopping the motor 2.

According to a preferred embodiment of the invention, a sensor 16 is placed along the frame 10 for taking measurements along the lance tube 11 as it is retracted from the furnace. Among the information that can be gathered by the sensor are the temperature and temperature increase of the lance tube 11, which can be used to calculate the temperature inside the furnace; the carryover, the increase of deposits, i.e. soot or chemicals deposited on the lance tube 11, and the state of the soot and deposits. As soon as the steam is turned off, the lance tube 11 is fully subjected to the climate inside the furnace, which leads to a rise in temperature on the surface of the lance tube. As soon as it enters the furnace, the lance tube 11 is also subjected to deposition of soot or slag along the lance tube 11. By measuring as the lance tube 11 is being retracted, an estimate is obtained of the amount of soot or slag in the furnace, as well as the speed of soot increase and the temperature. The measurements take place along the entire length of the lance tube 11, and thereby a comprehensive image can be created, showing the data collected for every segment of the lance tube 11. By using such collections of data, the temperature, for instance, can be determined for every segment of the space inside the power boiler where the lance tube 11 has passed, and thereby trends can be created for the area as a whole. The carryover can be estimated by calculating the amount of black or red spots along the lance tube 11, and the state of the soot, as liquid, solid or gas, can be determined through image processing of the structure of the deposits. Since the sensor is placed outside of the furnace itself and is therefore not subjected to the extreme temperatures or chemicals involved, a sensitive sensor can be used and good results obtained.

A sensor 17 could also be placed directly on the surface of the lance tube 11 and thus follow the lance tube 11 into the furnace, making it possible to continuously record data of the conditions inside the furnace. In this preferred embodiment, the sensor 17 can be powered by a receiver 18 located in the tube 13 and transmit the data from the measurements continuously during the movement of the lance tube 11 inside the furnace. The tube 13 can act as an electric wave guide, guiding the signals towards the receiver 18. Alternatively, the sensor 17 can store information during the movement inside the furnace and transmit to the receiver 18 after the lance tube 11 has been completely retracted from the furnace.

The heating of the lance tube 11 after the sootblowing steam has been removed is determined by the material of the lance tube 11 itself, the furnace load, the flow of flue gas, the flue gas temperature and the amount of cooling steam used, if any. By measuring the temperature of the lance tube 11 as it passes through the outer wall 9 of the furnace from the stage when it is fully extended into the furnace and during the retraction, until the lance tube 11 is as its other end position, completely outside the furnace, the total heat influence from the flue gas along the direction of motion can be determined and the average temperature of the flue gas can be estimated as well as the temperature variations in the furnace along the path of the lance tube 11.

The amount of soot along the lance tube 11 can give an estimate of the amount of chemicals present in the flue gas. By measuring the thickness of the soot layer with laser or image processing, an estimate of the soot increase per time unit inside the furnace can be obtained and presented. The state of the flue gas (as a solid, a liquid or a gas) in different areas of the furnace can also be obtained by using image processing on the soot deposited on the lance tube 11. By using the sensor 17 placed on the surface of the lance tube 11, direct measuring of these properties on the heat surfaces of the furnace can also be performed, as well as a variety of other measurements of the state of the soot, slag or dust in the furnace.

For measuring the temperature inside the furnace, data can be recorded by a sensor 17 that is placed on the surface of the lance tube 11 and that is capable of capturing images. By analyzing the color of the heat surfaces, and comparing these colors to known nuances corresponding to certain temperatures, a comprehensive model of the temperature distribution inside the furnace can be constructed.

Figure 4:
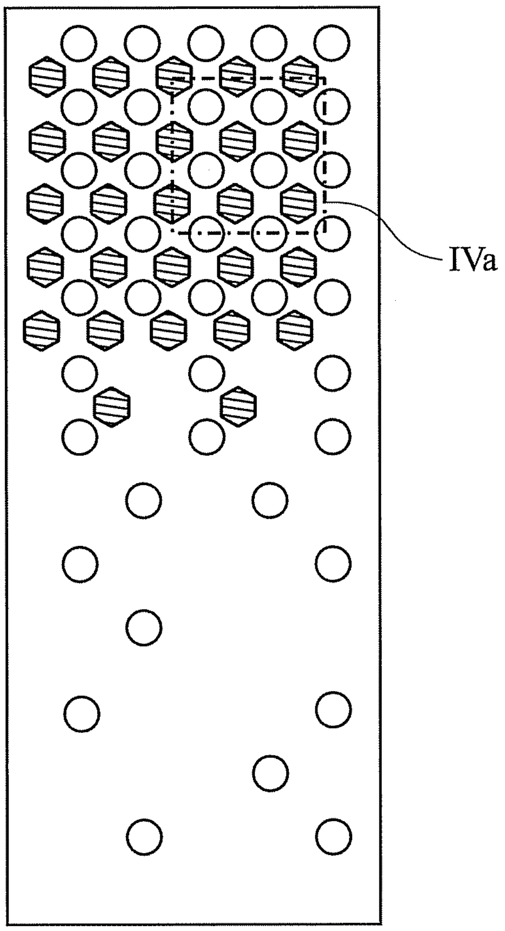
FIG. 4 is a 2D-view of the image of the surface of a lance tube of a sootblower according to the present invention, showing spots indicating carryover.
Figure 4A:
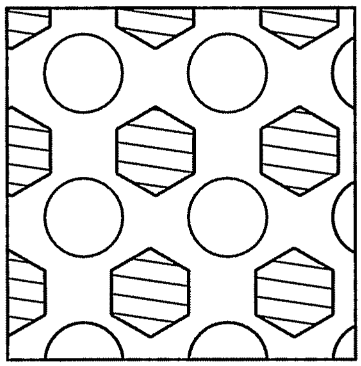
FIG. 4*a* is an enlargement of a section of FIG. 4, showing said spots in detail.

For determining the carryover, it is especially beneficial to use a sensor 16 for recording the visual properties of the surface of the lance tube 11 as it is being retracted from the furnace. The visual properties of color and spot size can be used to form a 2D or even 3D image of the surface of the lance tube 11 and can be interpreted by an automatic system or by a human process controller, and any increase or decrease in carryover can be noted. These images can also be stored and used for comparison with similar images recorded earlier or later and thus provide an excellent record of the changes with respect to time. An example of a 2D image of the surface of the lance tube 11 is shown in FIG. 4 where a square sample area is shown in FIG. 4*a*. The spots can be analyzed with respect to their color, where the presence and amount of black spots indicate unburned black liquor in the boiler and the presence and amount of pink spots show the presence of inorganic substances in the flue gas.

Figure 5:
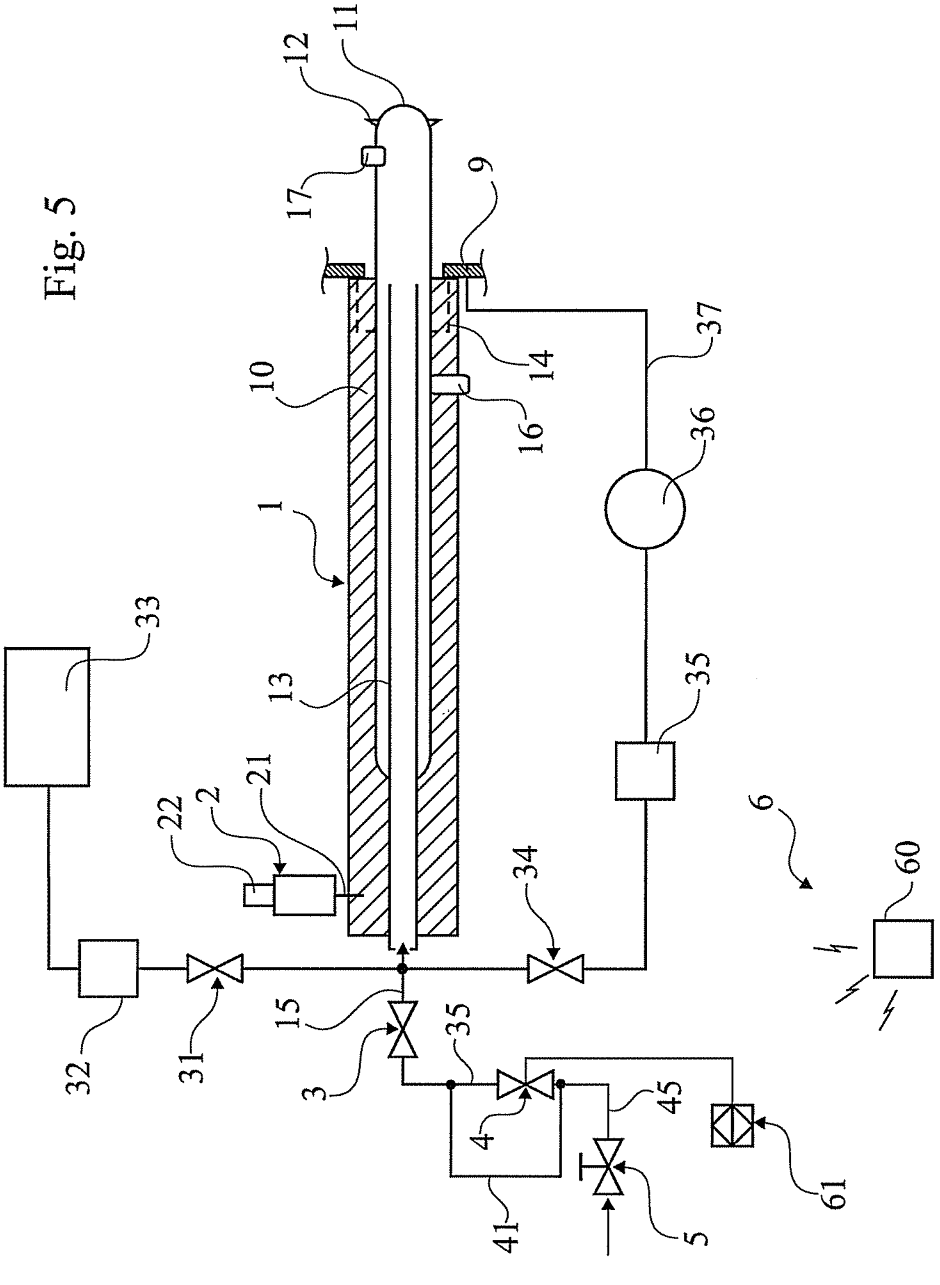
FIG. 5 is a schematic view of a sootblower equipped with a suction device for taking and analyzing a flue gas sample from the furnace.

The lance tube 11 of the sootblower can also be used to obtain a sample of the flue gas, as is shown in FIG. 5. When the steam is turned off, an on/off valve 31 can be opened to allow a suction mechanism 33 to suction a small amount of flue gas out of the furnace via the nozzle 12 and through the gas tube 13, passing said valve 31 an collecting in a box 32 for measurements and analysis. Here, the properties of the flue gas can be analyzed, such as the pH, or the amount of oxygen ($O_2$) or nitrogen oxides ($NO_x$).

It would also be possible to continuously analyze the properties of the flue gas, for instance through a system which is also shown in FIG. 5 where another on/off valve 34 can be opened to allow suction from a suction mechanism 36 to extract gas in a manner similar to that described above. The gas passes a sensor 35 where the properties of the flue gas are analyzed and is then transported back into the furnace via a pipe 37 which extends through the wall 9 of the furnace. This way, continuous measurements allow a process controller, whether human or computerized, to receive updated information on the state of the flue gas and allows for a greater control over the process.

By using the above mentioned received data from sensors and gas analysis separately or combined, detailed information regarding the process in the recovery furnace can be obtained. The amount of heat absorption in the heat surfaces, the flow of flue gases or the temperature at different locations in the furnace are among the information that can be gathered, and from these findings the efficiency of the combustion and/or recovery process can be estimated and controlled.

A furnace or boiler normally has a large amount of sootblowers and some or all of these can be used for measurements. Since they normally take turns cleaning the furnace, a number of lance tubes are idle at any given time. By using these idle sootblowers as well as the ones which are active, a large number of measurements on different locations in the furnace are possible, and the process controller can select those who at any given time give the best and most detailed amount of data on the state of the furnace. By presenting the results from flue gas analysis, image processing and temperature estimates as 2D or 3D images, a detailed model showing the state of the recovery furnace can thus be presented and the process controlled accordingly. The spray angles for the black liquor entering the recovery furnace, as well as the amount of air inserted through the openings in the furnace and the amount and intensity of sootblowing can be automatically controlled based on these results, or can be presented to an operator who can control the process manually.

The data collected by the sensor(s) can be analyzed by a control unit 60, which can receive input from a plurality of sensors and/or a plurality of analyses of the properties of the flue gas. All the information gained through measurements can also be stored, in its raw form as well as in the form of processed data, and can be used for the creation of long-time and short-time trends, analyses, calculations, etc.

It is to be understood that the invention is not limited by the embodiments described above. It would be possible to use a variety of sensors with the invention, and to place them at different locations in the frame 10 of the sootblower or inside or on the outer wall 9. It would also be possible to use sensors placed on the lance tube 11 itself. Further, it is evident to the skilled person that the method according to the invention may be used with any different kinds of sootblowers. The invention could also be used with any type of power boiler furnaces, as well as in any type of heat exchanger or chemical reactor where cleaning apparatus similar to sootblowers and powered by steam, water or air is used.

The invention claimed is:

1. A method for measuring the conditions inside a power boiler comprising using a soot blower as a measuring probe to measure at least one condition within the furnace of said power boiler, further comprising taking a sample of the gas inside the power boiler using a lance tube of the soot blower.

2. The method according to claim 1, further comprising measuring the at least one condition when the lance tube of the soot blower is not used for cleaning the power boiler.

3. The method according to claim 1, further comprising measuring the at least one condition at the same time as the lance tube of the soot blower is used for cleaning the power boiler.

4. The method according to claim 1, wherein the at least one condition is temperature and the soot blower is used for measuring temperature.

5. The method according to claim 1, wherein the at least one condition is carryover and the soot blower is used for measuring carryover.

6. The method according to 1, wherein the at least one condition is selected from the group consisting of soot/dust build-up; shape and structure of soot/dust; soot/dust color; visual image; number of spots; surface rawness; dust pH; dust thickness; and dust hardness.

7. The method according to claim 1, wherein measuring the at least one condition includes using a sensor mounted in connection to the lance tube of the soot blower that can communicate with a receiver mounted outside the boiler through any suitable means.

8. The method according to claim 7, wherein the suitable means comprises radio waves transmitted along or inside the lance tube.

9. The method according to claim 1, wherein measuring the at least one condition includes using a sensor mounted in connection to the lance tube of the soot blower that can store information for subsequent reading.

10. The method according to claim 1, wherein measuring the at least one condition includes using a sensor mounted in connection to the lance tube of the soot blower that is powered by a device mounted outside the boiler through any suitable means.

11. The method according to claim 10, wherein the suitable means comprises radio waves transmitted along or inside the lance tube.

12. The method according to claim 1, wherein a steam tubing inside the measuring probe is used as an electric wave guide to facilitate communication between the sensor and a receiver, where at least one of said sensor and receiver is located at least temporarily inside the boiler.

13. The method according to claim 1, wherein the lance tube of the soot blower is used to measure the heat absorption at heat surfaces in the boiler.

14. The method according to claim 1, wherein information given by the measurements is used to automatically control the soot blowing system.

15. The method according to claim 1, wherein information given by the measurements is used to automatically control the distribution of air between openings inside the power boiler.

16. The method according to claim 1, wherein information given by the measurements is used to automatically control spray angles for liquor.

17. The method according to claim 1, wherein information given by the measurements is used to automatically control fuel temperature.

18. The method according to claim 1, wherein information given by the measurements is used to automatically control fuel pressure.

19. The method according to claim 1, wherein information given by the measurements is used to automatically control burner settings.

20. The method according to claim 1, wherein information given by the measurements is used to detect combustion conditions inside the boiler.

21. The method according to claim 1, wherein information given by the measurements is used to detect chemical state inside the boiler.

22. The method according to claim 1, wherein information given by the measurements is used for image processing in order to present the results as an image.

23. A system for measuring the conditions in a power boiler, comprising:

a control unit;

at least one sensor mounted external to a furnace of a power boiler and being connected to the control unit; and a measuring probe comprising a lance tube of a soot blower, the lance tube configured to convey a sample of gas from within the furnace of the power boiler to the sensor, the sensor being arranged to measure at least one condition inside the furnace of said power boiler.

24. The system according to claim 23, wherein said at least one sensor belongs to a sensor arrangement where the at least one sensor is of the type IR sensor, PTIOOO sensor, Vision system sensor, IR camera system sensor, digital camera sensor, spectrometer, gas analysis sensor, laser sensor, ultra sound sensor, spot counter, or $O_2$, CO, NO or pH sensor.

25. The system according to claim 23, wherein the at least one sensor is constructed for measuring at least one of the following:

temperature;

carryover;

soot/dust build-up;

shape and structure of soot/dust;

soot/dust color;

visual image;

number of spots;

surface rawness;

dust pH;

dust thickness; and dust hardness.

* * * * *